United States Patent [19]

Smith et al.

[11] Patent Number: 4,716,848
[45] Date of Patent: Jan. 5, 1988

[54] CLOSE TOLERANCE PIN CONNECTION

[75] Inventors: Lancing G. Smith; Lonnie R. Walker; William J. Denison, all of Duncan, Okla.

[73] Assignee: Halliburton Company, Duncan, Okla.

[21] Appl. No.: 757,116

[22] Filed: Jul. 19, 1985

[51] Int. Cl.$^4$ ............................................. B63B 25/08
[52] U.S. Cl. ....................................... 114/75; 403/324
[58] Field of Search ......................... 114/77 R, 75, 259; 89/362; 264/263; 403/324, 378, 379; 410/69, 71, 81, 91; 29/150, 434, 469, 526 R

[56] References Cited

U.S. PATENT DOCUMENTS

2,728,319 12/1955 Engstrand ........................ 114/77 R
3,859,804 1/1975 Koehler et al. ..................... 114/259

Primary Examiner—Sherman D. Basinger
Assistant Examiner—Jesûs D. Sotelo
Attorney, Agent, or Firm—James R. Duzan

[57] ABSTRACT

A close tolerance pin connection includes a cylindrical connecting pin. A first sturcture has a first pin receiving hole disposed therethrough for closely receiving the connecting pin. A second structure has a second pin receiving hole disposed therethrough for loosely receiving the connecting pin. A weld washer has a third pin receiving hole disposed therethrough for closely receiving the connecting pin, and the weld washer is adapted to be located adjacent and engage the second structure. The connecing pin is received in the first, second and third pin receiving holes and the weld washer is then welded to the second structure so that the first and second structures are connected by the connecting pin. The connecting pin is closely received within the first hole of the first structure and is also closely received in the third hole of the weld washer which is fixed to the second structure, thus providing a close tolerance pin connection between the first and second structures after the weld washer is welded to the second structure.

18 Claims, 13 Drawing Figures

Fig. 3 fig. 10 fig. 11    fig. 12

CLOSE TOLERANCE PIN CONNECTION

BACKGROUND OF THE INVENTION

1. Field of the Invention

The invention relates to a close tolerance pin connection which is particularly adapted for use with a structural support system for supporting equipment from the deck of a floating vessel.

2. Description of the Prior Art

The concept of utilizing pin connections for mounting equipment to a structural support is one that has been widely used in many different contexts.

These prior art pin connection systems, however, typically have provided a relatively loose pin connection in order that some adjustment is provided for misalignment of the holes through which the pins are to be received.

In the past, it has not been practical to try to provide very close tolerance pin connections between large items of equipment, because of the difficulty of originally prefabricating the items of equipment to have the pin receiving holes aligned closely enough to receive a close tolerance pin.

SUMMARY OF THE INVENTION

The present invention provides an improved close tolerance structural pin connection which allows for initial misalignment between the structures being connected, but ultimately provides a very close tolerance pin connection between the structures.

This system utilizes a cylindrical connecting pin. A first structure has a first pin receiving hole means disposed therethrough for closely receiving the connecting pin. A second structure has a second pin receiving hole means disposed therethrough for loosely receiving the connecting pin.

A weld washer has a third pin receiving hole means disposed therethrough for closely receiving the connecting pin. The weld washer is adapted to be located adjacent and to engage the second structure.

The connecting pin is disposed through the first, second and third pin receiving hole means, and then the weld washer is welded to the second structure.

This initially allows for misalignment between the first and second hole means, because the second hole means has a larger diameter than the first hole means. Subsequent to the welding of the weld washer to the second structure, however, a very close tolerance pin connection is provided because the connecting pin is closely received in the first hole means of the first structure, and is also closely received in the third hole means of the weld washer which is welded to the second structure.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
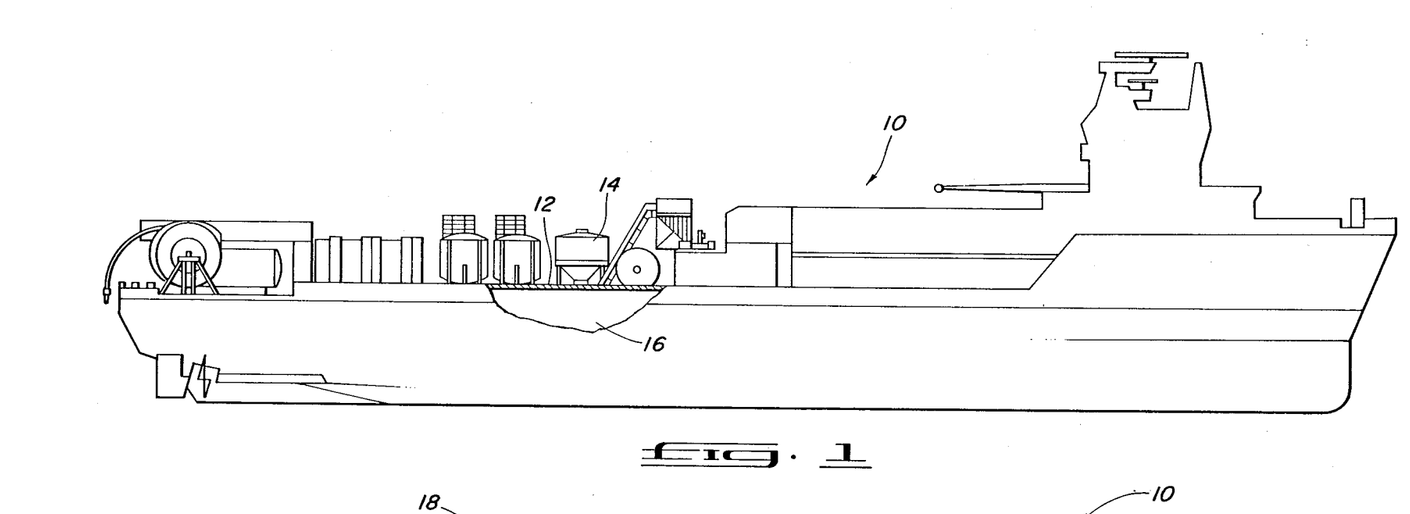
FIG. 1 is a side elevation view of a floating vessel which incorporates the present invention.

Referring now to the drawings, and particularly to FIG. 1, a floating vessel 10 is thereshown in side elevation view. The vessel 10 includes a main deck 12 upon which are located a plurality of items of heavy equipment such as 14. Each of the items such as 14 can generally be referred to as an equipment module.

As is somewhat schematically illustrated in FIG. 1, there is below the deck 12 an open space generally referred to as a hold 16.

Figure 2:
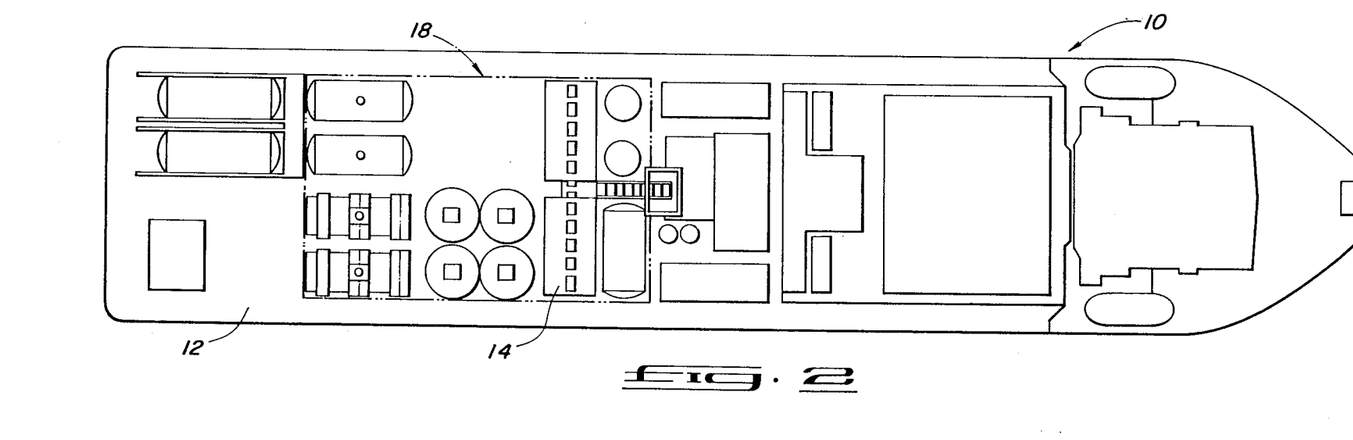
FIG. 2 is a plan view of the main deck of the vessel of FIG. 1, showing numerous items of heavy equipment there in place. The general location of the support grid means is indicated in phantom lines.

In the particular embodiment of the invention illustrated in FIGS. 1 and 2, the various equipment modules, such as 14, are components of a system for injecting fluids into offshore oil and gas wells. The various items of equipment illustrated include numerous storage tanks for both dry and liquid materials, various conveying systems, pumping systems, control systems and the like for mixing, pumping and monitoring the various fluids that are injected into the wells. The equipment module which has been designated by the numeral 14 is a dry material storage bin. The equipment needed for various well stimulation jobs will vary depending upon the type of job being run. By mounting the equipment in detachable modules such as 14, the equipment in place on the ship 10 can be easily changed to meet the needs of a particular job.

Referring now to FIG. 2, which is a plan view of the main deck 12 showing the various items of equipment located thereon, a rectangular phantom line indicates the location of a support grid means or supporting framework 18 located below the various items of equipment, such as the storage bin 14, which are illustrated in FIG. 2 as being located within the rectangular phantom line.

Figure 3:
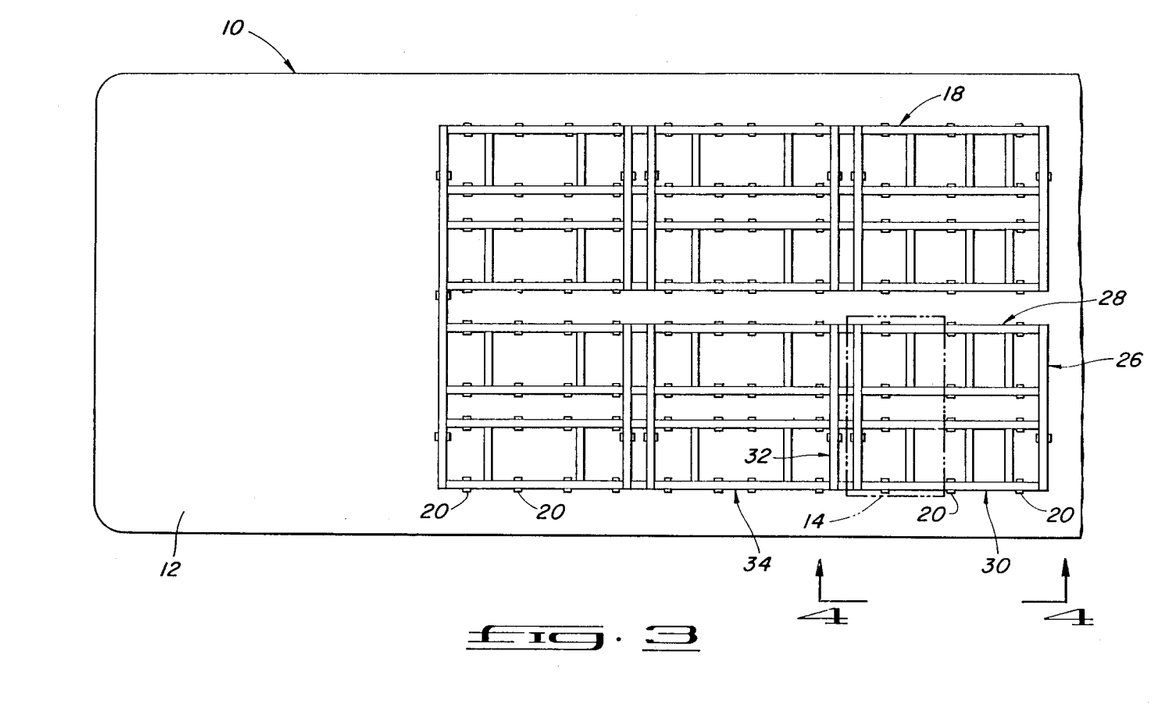
FIG. 3 is an enlarged plan view of approximately the rear one-half of the deck shown in FIG. 2, with the heavy equipment removed, and with the support grid means shown in place on the deck.

Referring now to FIG. 3, an enlarged plan view similar to FIG. 2 is thereshown of the rear one-half of the vessel 10, with all of the heavy equipment such as 14 having been deleted from the drawing.

In place upon the deck 12 there is shown the support grid means 18 in the location which was indicated in phantom lines in FIG. 2.

A rectangular phantom line shown in the lower right portion of FIG. 3 illustrates the location of the dry material storage bin 14 previously seen in FIGS. 1 and 2.

As seen in FIG. 3, the support grid means 18 is supported from the deck 12 on a plurality of bracket means 20. Although dozens of bracket means 20 are visible in FIG. 3, only a few of them have been numbered.

Figure 5:
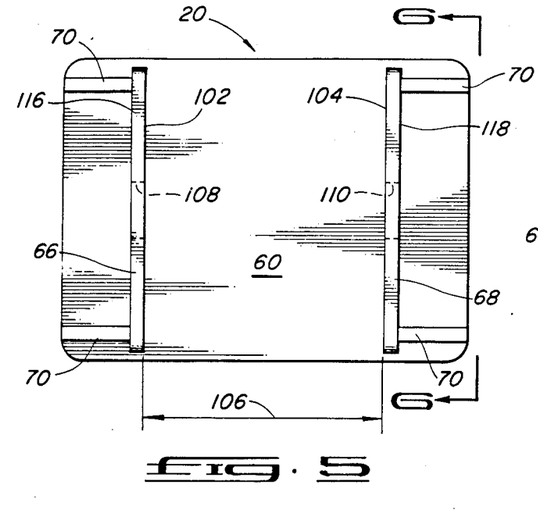
FIG. 5 is a plan view of one of the bracket means for supporting the beams of the support grid means from the deck of the floating vessel.
Figure 6:
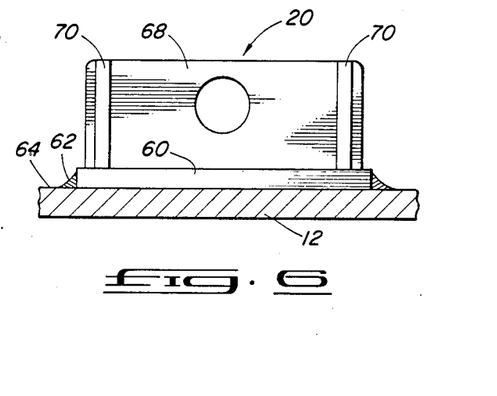
FIG. 6 is a right end elevation view, taken along line 6—6 of FIG. 5, of the bracket means of FIG. 5.

FIGS. 5 and 6, which are discussed in more detail below, show typical plan and elevation views, respectively, of one of the bracket means 20.

As is apparent in FIG. 3, the support grid means 18 includes a plurality of interconnected substantially horizontally oriented beams.

Each of these beams is detachably connected by a detachable connecting means 22 (see FIGS. 4 and 7) to one or more of the bracket means 20. The detachable connecting means 22, which as further described below generally includes connecting pin 72, allows the support grid means 18 to be attached to the plurality of bracket means 20 without the need for welding to the deck 12 after the plurality of bracket means 20 has previously been welded to the deck 12. At least one of the detachable connecting means 22 is associated with each of the bracket means 20.

A plurality of equipment mounting means 24 (see FIGS. 4 and 11) are operably associated with the support grid means 18 for mounting the various items of equipment such as the storage bin 14 above the support grid means 18.

The various beams of the support grid means 18 are prefabricated into a plurality of beam frame sections, which are subsequently mounted upon the bracket means 20 and interconnected together to form the support grid means 18.

Figures 3A, 4:
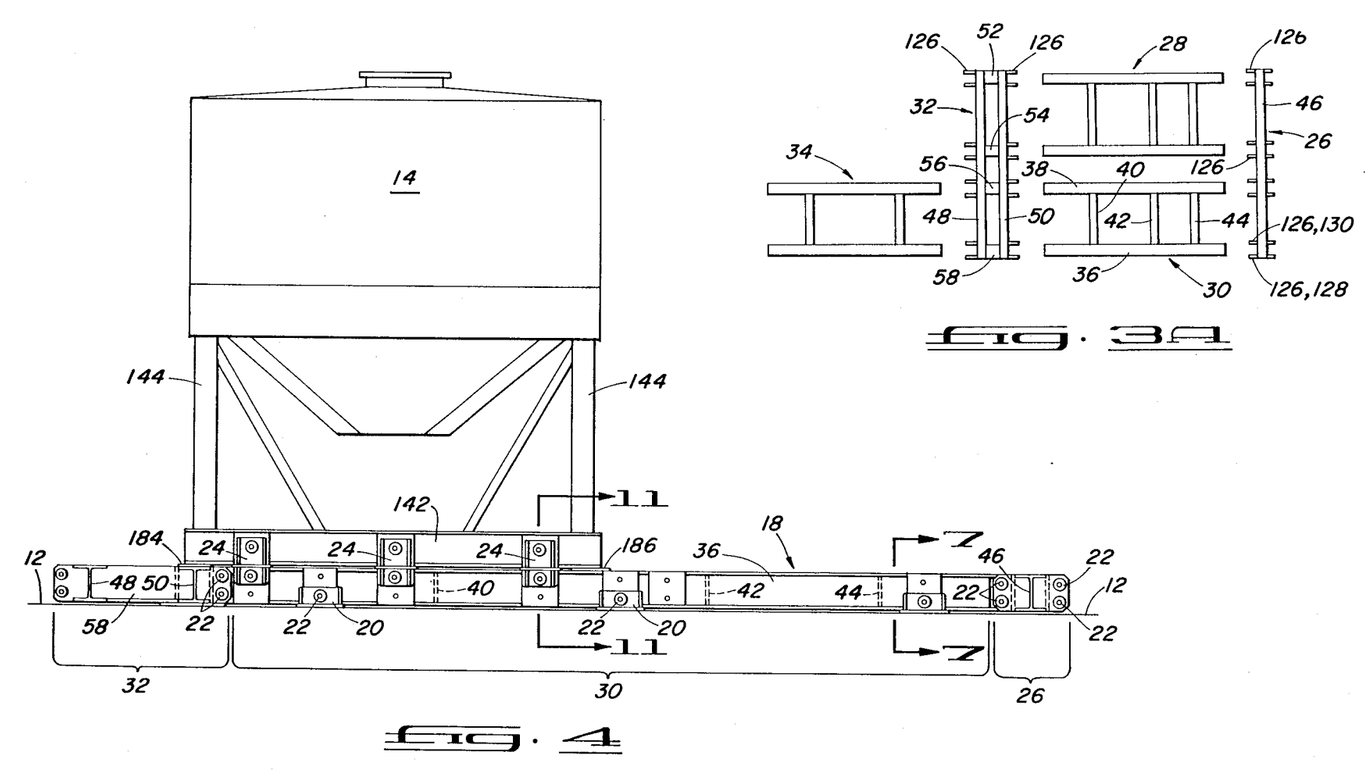
FIG. 3A is an exploded view of a lower right portion of the grid system of FIG. 3.
FIG. 4 is a side elevation view of a portion of the support grid means shown in FIG. 3, as indicated by the line 4—4 on FIG. 3, and also illustrating one equipment module in place upon the illustrated portion of the support grid means.

A few of these beam frame sections, corresponding to the lower right corner of the support grid means 18 as viewed in FIG. 3, are shown in an exploded view in FIG. 3A.

FIG. 3A shows five of the beam frame sections which are generally designated by the numerals 26, 28, 30, 32, and 34.

The various beam frame sections such as 26-34 are to two general types.

The larger ones of the beam frame sections such as 28, 30 and 34 can generally be referred to as substantially rectangular beam frame sections 28, 30 and 34, each of which rectangular beam frame sections includes at least four linear beams which are fixedly connected together, preferably by welding, to form a generally rectangular shape.

For example, rectangular beam frame section 30 includes beams 36, 38, 40, 42 and 44. Although the ends of the longer beams 36 and 38 extend beyond the outermost connecting beams 40 and 44 to form a ladder-like shape as seen in FIG. 3A, the beam frame section 30 can generally be referred to as being a generally rectangular shape.

Other ones of the beams of the support grid means 18 define intermediate beam frame sections such as 26 and 32, which are located between the rectangular beam frame sections and which are detachably connected to at least two of the rectangular beam frame sections.

For example, beam frame section 26 which may be referred to as an intermediate single beam frame section 26 is detachably connected to the rectangular beam frame sections 28 and 30 as seen in FIG. 3. The intermediate single beam frame section 26 has a single linear beam 46.

Also, the beam frame section 32 which may be generally referred to as an intermediate double beam frame section 32, is connected to rectangular beam frame sections 28, 30 and 34 seen in FIG. 3A and to another unnumbered rectangular beam frame section above rectangular beam frame section 34, as seen in FIG. 3.

The intermediate double beam frame section 32 includes two long parallel linear beams 48 and 50, and four short connecting beams 52, 54, 56 and 58.

As can be seen in FIG. 4, the intermediate beam frame sections such as 26 and 32 are connected to the rectangular beam frame sections such as 30 and 34 by detachable connecting means 22 like those utilized to connect the various beams of support grid means 18 to the bracket means 20. A typical end connection between the beam sections, such as the connection between beam 46 of intermediate single beam frame section 26 and beam 36 of rectangular beam frame section 30 is shown in greater detail in FIGS. 9 and 10 which are further explained below.

Referring now to FIGS. 5-8, each of the bracket means 20 is a U-shaped bracket means including a base plate 60 which is welded as indicated at 62 to an upper surface 64 of the deck 12.

Each of the bracket means 20 includes first and second substantially parallel mounting plates 66 and 68 which are welded to and extend upwardly from the base plate 60.

Figure 7:
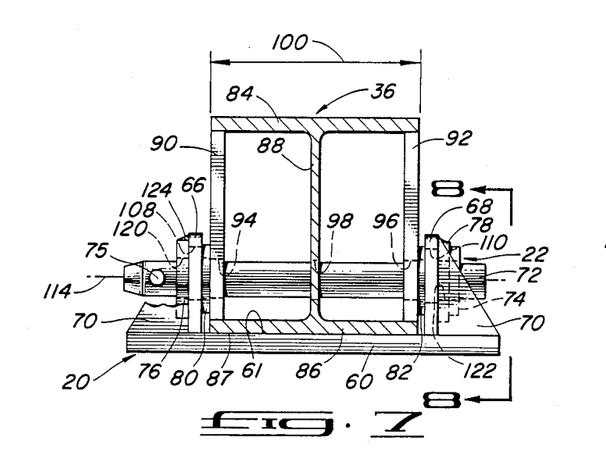
FIG. 7 is a section view taken along line 7—7 of FIG. 4 and shows a typical mounting of one of the beams of the support grid means from one of the bracket means like that of FIG. 5.

As seen in FIG. 7, each of the beams such as 36 is received between the mounting plates 66 and 68 of its associated bracket means 20 and is detachably connected thereto by one of the detachable connecting means 22.

As best seen in FIG. 5, four triangular shaped gusset plates 70 are welded to the base plate 60 and to one of the mounting plates 66 or 68 to brace the mounting plates 66 and 68 against lateral deflection.

As best seen in FIG. 7, each of the detachable connecting means 22 includes a cylindrical connecting pin 72 having an enlarged head 74 on one end thereof and having a retaining means 75 on the other end thereof. Each detachable connecting means 22 also includes first and second weld washers 76 and 78, and first and second spacer washers 80 and 82.

The apparatus seen in FIG. 7 including a bracket means 20, the beam 36, and the detachable connecting means 22 can collectively be referred to as a close tolerance structural pin connection system.

In this close tolerance structural pin connection system, the beam 36 may be generally referred to as a first structure 36, and the bracket means 20 can be generally referred to as a second structure 20.

The beam 36 is a conventional I-beam having upper and lower flanges 84 and 86 connected by a web 88. At each point of connection to one of the bracket means 20, the beam 36 has been boxed by welding supporting side plates 90 and 92 between the upper and lower flanges 84 and 86 near their outer edges.

Thus, the beam 36 can generally be referred to as a first structural member 36 including first and second substantially parallel side walls 90 and 92, and third and fourth substantially parallel side walls 84 and 86 fixedly joined to and extending between the first and second side walls 90 and 92.

The first and second side walls 90 and 92 have aligned first and second pin receiving holes or bores 94 and 96 disposed therethrough for closely receiving the connecting pin 72. Another pin receiving hole 98 is disposed through web 88.

The beam 36 has a width 100 defined parallel to the flanges 84 and 86.

The mounting plates 66 and 68 have their inner surfaces 102 and 104 (see FIG. 5) spaced apart by a distance 106 greater than the width 100 of beam 36, so that the beam 36 can be received between the mounting plates 66 and 68 as seen in FIG. 7.

Beam 36 includes a flat outer surface 87 of lower flange 86 which engages a flat upper surface 61 of base plate 60. The upper surface 61 can be referred to as a major surface 61 of base plate 60, as distinguished from the edges of the base plate 60 which would not be considered to be major surfaces.

The mounting plates 66 and 68 have third and fourth pin receiving holes or openings 108 and 110, respectively, disposed therethrough for loosely receiving the connecting pin 72.

Figure 8:
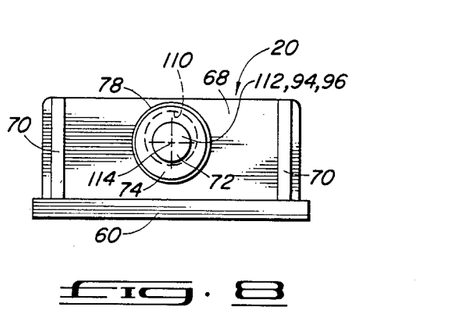
FIG. 8 is an end elevation view taken along line 8—8 of FIG. 7 which shows the eccentric mounting of the connecting pin within the enlarged diameter openings of the bracket means.

The third and fourth pin receiving holes 108 and 110 are substantially aligned with the first and second pin receiving holes 94 and 96 in side plates 90 and 92 of beam 36, so that pin 72 can be received through all of the pin receiving holes. The third and fourth pin receiving holes 108 and 110 are not, however, necessarily coaxially aligned with the first and second holes 94 and 96 as is seen in FIG. 8.

The first and second pin receiving holes 94 and 96 as previously mentioned are constructed to closely receive the connecting pin 72. Preferably there is a clearance of only about 0.002 inch between pin receiving holes 94 and 96 and an outer cylindrical surface 112 of cylindrical connecting pin 72, so in FIG. 8 the location of holes 94 and 96 can be considered to be coincident with the outer surface 112 of connecting pin 72. As is seen in FIG. 8, an imaginery projection of one of the first and second hole means 94 and 96 parallel to a central axis 114 of connecting pin 72 is contained within the larger pin receiving holes 108 and 110 of the mounting plates 66 and 68.

The spacer washers 82 and 80 are located between the side walls 90 and 92 of beam 36 and the mounting plates 66 and 68 of bracket means 20. The spacer washers 80 and 82 also have pin receiving holes disposed therethrough for receiving the connecting pin 72.

The weld washers 76 and 78 located adjacent outer surfaces 116 and 118 of mounting plates 66 and 68 have pin receiving holes 120 and 122, respectively, disposed therethrough for closely receiving the outer surface 112 of connecting pin 72. The clearance between pin 72 and the pin receiving holes 120 and 122 of weld washers 76 and 78 is also preferably approximately 0.002 inch.

The purpose of the close tolerance pin connection illustrated in FIG. 7 is to provide a system whereby misalignment between the beams such as beam 36 and each of the bracket means 20 can be adjusted for initially, while still ultimately providing a very close tolerance pin connection between the beam 36 and the bracket means 20, so as to very securely locate the various items of equipment, such as 14, on the deck 12 of the vessel 10.

As previously mentioned, the purpose of the overall grid system concept is to allow the bracket means 20 to be welded to the deck 12 prior to the location of the grid system 18 and the various items of equipment 14 on the deck 12.

It is not practical to expect to be able to locate each of the bracket means 20 upon the deck 12 so accurately that a system having very close tolerances in the pin connections, on the order of a few thousandths of an inch, could be constructed. Some means must be provided for adjusting for misalignment more on the order of approximately one-half inch in the initial location of these pieces.

The close tolerance structural pin connection system of FIG. 7 allows for such an initial adjustment to be made, but ultimately provides a pin connection having a tolerance on the order of a few thousandths of an inch. This is accomplished in the following manner.

The entire support grid means 18 and the associated bracket means 20 illustrated in FIG. 3 are prefabricated by prefabricating the various beam frame sections as seen in FIG. 3A, and by constructing each of the bracket means 20.

Then, the plurality of bracket means 20 are located at the appropriate positions on the deck 12 as seen in FIG. 3 and are welded to the deck 12 as illustrated in FIG. 6.

During the welding of the bracket means 20 to the deck 12 the hold 16 of the floating vessel 10 must be maintained in a weld safe condition.

Subsequent to the welding of all of the bracket means 20 to the deck 12, the various beam frame sections such as 26-34 seen in FIG. 3A are located, one at a time, adjacent the appropriate ones of the bracket means 20 with the various linear beams such as 36 of the beam frame sections being received between the mounting plates such as 66 and 68 of one of the bracket means 20 as seen in FIG. 7.

Misalignment of the pin receiving holes 94 and 96 of the beams such as 36 with the pin receiving holes 108 and 110 of the bracket means 20 in a plane perpendicular to the longitudinal axis 114 of connecting pin 72 is adjusted for and accommodated by an eccentric orientation of the pin 72 within the larger pin receiving holes 108 and 110 as seen in FIG. 8. By way of example, the pin 72 may have a nominal diameter of 2.0 inches, while the pin receiving holes 108 and 110 may have a nominal diameter of 3.0 inches. The weld washers 76 and 78 are an integral part of the means for adjusting for such misalignment.

Misalignment between the beams such as 36 of the various beam frame sections with their bracket means 20 in directions parallel to the longitudinal axis 114 of the connecting pin 72 is accommodated due to the difference between the distance 106 (see FIG. 5) between mounting plates 66 and 68 as compared to the width 100 (see FIG. 7) of beam 36. The spacer washers 80 and 82 are an integral part of the means for adjusting for this misalignment.

After the beam 36 is placed between the mounting plates 66 and 68 of bracket means 20, spacer washers 80 and 82 of appropriate thicknesses can be chosen to substantially fill the space between the mounting plates 66 and 68 and the side walls 90 and 92, respectively, of beam 36.

To accomplish this, a plurality of spacer washers 80 and 82 of varying thicknesses are available. The appropriate washers are chosen and placed between the mounting plates 66 and 68 and the side walls 90 and 92 as seen in FIG. 7.

Then a connecting pin 72 is first assembled with one weld washer 78 adjacent its enlarged head 74 and the connecting pin 72 is then inserted, as seen in FIG. 7, from right to left through pin receiving opening 110, through the opening of spacer washer 82, through pin receiving holes 96, 98 and 94 of beam 36, through spacer washer 80 and then through pin receiving hole 108 of mounting plate 66.

Then, the weld washer 76 is placed over the left end of connecting pin 72 and abutted against the outer surface 116 of mounting plate 66.

Figure 10:
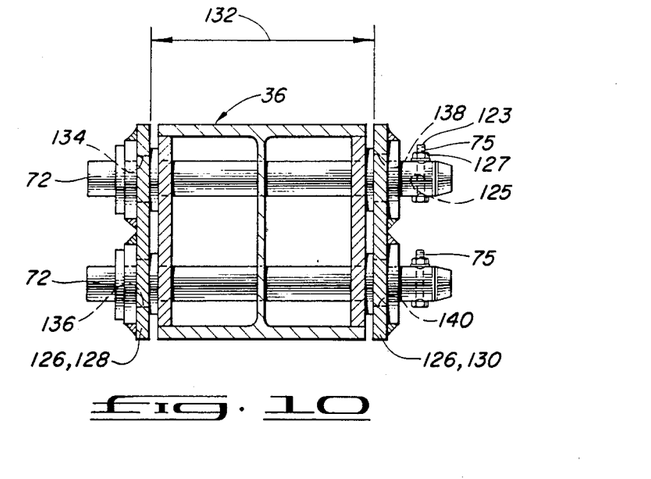
FIG. 10 is a section view taken along line 10—10 of FIG. 9, further illustrating the interconnection of the beam sections.

Then the retaining means 75 is assembled with the left end of connecting pin 72 to hold the connecting pin 72 in place. The retaining means 75, as best seen in FIG. 10, includes a bolt 123 which is placed through a transverse bore 125 through the connecting pin 72 and held in place therein by a threaded nut 127.

The weld washers 76 and 78 are welded to the outer surfaces 116 and 118 of mounting plates 66 and 68, respectively, as indicated for example at 124 in FIG. 7. Since this weld 124 is not made directly to the deck 12, but instead is on an upper portion of the bracket means 20, it is not necessary to maintain the hold 16 in a weld safe condition.

Once the weld washers 76 and 78 are welded to the support plates 66 and 68, the pin 72 provides a very close tolerance pin connection between the beam 36 and the bracket means 20 because of the very small clearances between connecting pin 72 and the pin receiving holes 94 and 96 of beam 36 and the pin receiving holes 120 and 122 of the weld washers 76 and 78.

Generally speaking, the pin receiving holes 108 and 110 disposed through the mounting plates 66 and 68 of bracket means 20 can collectively be referred to as a pin receiving hole means disposed through the bracket means 20 for loosely receiving the connecting pin. Similarly, the pin receiving holes 94 and 96 of beam 36 can generally be referred to as a pin receiving hole means for closely receiving the pin 72 in the beam 36.

TYPICAL END CONNECTIONS BETWEEN BEAM FRAME SECTIONS

Figure 9:
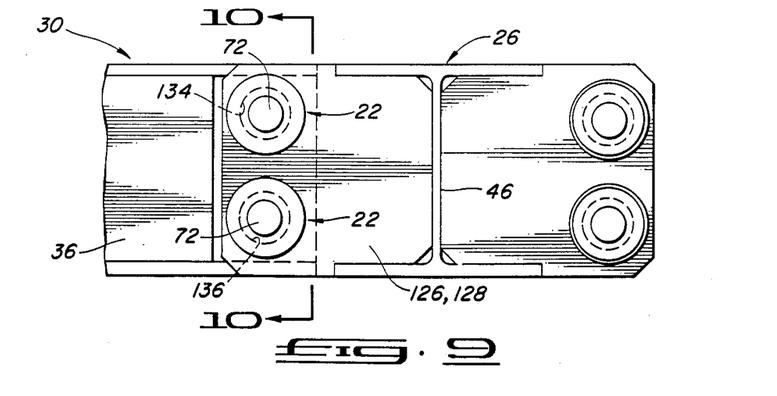
FIG. 9 is an enlarged view of the right end portion of FIG. 4, which illustrates a typical end connection between an intermediate beam frame section and one of the larger rectangular beam frame sections of the support grid means.

Referring now to FIGS. 9 and 10, the details of a typical end connection between beam frame sections will now be described.

Each of the intermediate beam frame sections such as intermediate single beam frame section 26 includes at least one linear beam such as 46 having at least two connecting means such as 126 thereon. Each of the connecting means 126 includes a pair of substantially parallel plates 128 and 130 fixed to the linear beam 46 and extending substantially perpendicular to a longitudinal axis of the linear beam 46.

The plates 128 and 130 are spaced by a distance 132 sufficient to receive the beam 36 of rectangular beam frame section 30 therebetween.

Plate 128 includes upper and lower pin receiving holes 134 and 136 for loosely receiving two connecting pins 72. Plate 130 includes upper and lower pin receiving holes 138 and 140 aligned with the pin receiving holes 134 and 136, respectively.

Thus, as seen in FIGS. 9 and 10, two parallel vertically spaced connecting pins 72 connect the plates 128 and 130 of connecting means 126 of intermediate single beam frame section 26 with the beam 36 of rectangular beam frame section 30. This provides a connection between the intermediate beam frame section 26 and rectangular beam frame section 30 capable of transmitting bending loads therebetween due to the use of two vertically spaced connecting pins 72.

The details of construction of the weld washers, and spacer washers utilized with the connecting pin 72 shown in FIGS. 9 and 10 are similar to that previously described with regard to FIG. 7 and need not be repeated.

TYPICAL EQUIPMENT MOUNTING CONNECTIONS

Referring now to FIG. 1, the details of construction of the equipment mounting means 24 will now be described.

Figure 11:
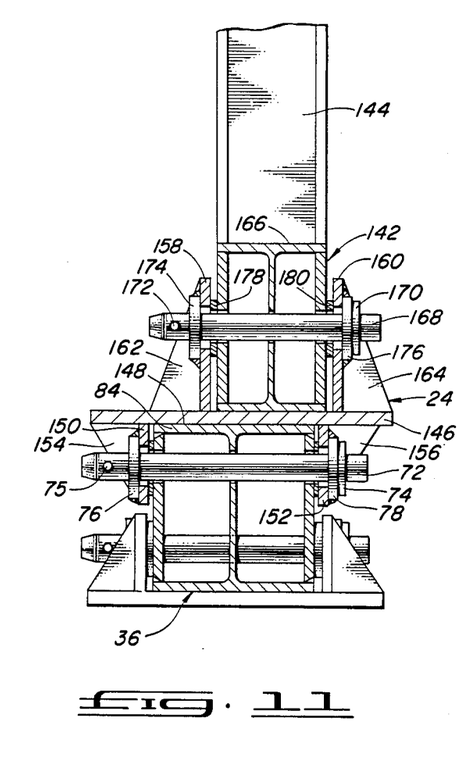
FIG. 11 is a section view taken along line 11—11 of FIG. 4, which illustrates in detail how an item of heavy equipment is mounted to the support grid means.

Each of the items of equipment such as storage bin 14 includes a base frame such as 142. The storage bin 14 is supported by a plurality of vertical legs 144 from its base frame 142.

The base frame 142 is supported by at least three of the equipment mounting means 24.

Each of the equipment mounting means 24 includes a substantially horizontal mounting plate 146 which engages and is supported from an upper surface 148 of upper flange 84 of beam 36.

As seen in FIG. 11, the horizontal mounting plate 146 is connected to the beam 36 by the use of a connecting pin 72 and weld washers 76 and 78.

Vertically downward extending mounting plates 150 and 152 are welded to horizontal mounting plate 146 and are supported by triangular shaped gussets 154 and 156.

The pin connection 72 between the equipment mounting means 24 and the beam 36 as seen in FIG. 11, is similar to the connection previously described with regard to FIG. 7, except it is noted that the spacer washers are used in connecting the equipment mounting means 24 to the beam 36 are relatively thin. This is because the beam 36 is already in place and the relatively small structure of the equipment mounting means 24 can easily be positioned on top of the beam 36.

The equipment mounting means 24 also includes first and second vertically upward extending mounting plates 158 and 160 supported by triangular gussets such as 162 and 164.

A horizontally extending I-beam 166 of base frame 142 of equipment 14 is received between the vertically upward extending mounting plates 158 and 160 as seen in FIG. 11.

The beam 166 is connected to the equipment mounting means 24 with a cylindrical connecting pin 168, in a manner similar to that previously described with regard to FIG. 7.

The cylindrical connecting pin 168 includes an enlarged head 170 at one end and a retaining means 172 at the other end. It utilizes weld washers 174 and 176 and spacer washers 178 and 180 in a manner similar to that previously described with regard to FIG. 7.

Spacer plates such as 184 and 186 (see FIG. 4) of a thickness equal to the thickness of the horizontal mounting plate 146 seen in FIG. 11 are located beneath the corners of the base frame 142. The spacer plates 184 and 186 are welded to the upper flange 84 of beam 36.

Figure 12:
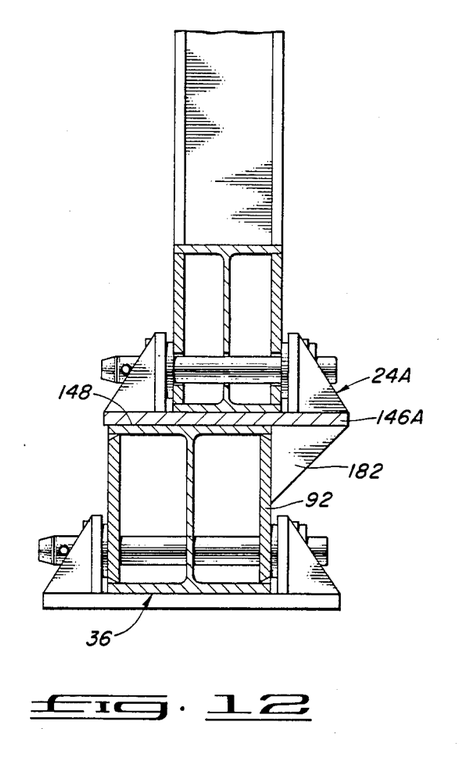
FIG. 12 is a view similar to FIG. 11, but illustrating an alternative means of mounting an item of heavy equipment on the support grid means.

Referring now to FIG. 12, an alternative design for an equipment connecting means is shown and there designated by the numeral 24A. The equipment mounting means 24A includes a horizontal mounting plate 146A which is directly welded to the upper surface 148 of beam 36. A triangular support gusset 182 is also welded to the horizontal support plate 146A and to side wall 92 of beam 36.

Thus it is seen that the apparatus and methods of the present invention readily achieve the ends and advantages mentioned as well as those inherent therein. While certain preferred embodiments of the present invention have been illustrated for the purposes of the present disclosure, numerous changes in the arrangement and construction of parts and steps may be made by those skilled in the art, which changes are embodied within the scope and spirit of the present invention as defined by the appended claims.

What is claimed is:

1. A close tolerance structural pin connection system, comprising:
   a first cylindrical connecting pin;
   a first structure having a first pin receiving hole means disposed therethrough for closely receiving said connecting pin, said first structure including:
   first and second substantially parallel side walls and third and forth substantially parellel side walls fixedly joined to and extending between said first and second side walls;
   said first pin receiving hole means including aligned first and second pin receiving bores disposed through said first and second side walls, respectively, for clearly receiving said cylindrical pin therein; and
   said first structure having a width defined parallel to said third and fourth side walls;
   a second structure having a second pin receiving hole means disposed therethrough for loosely receiving said connecting pin, wherein:
   said second structure includes a pair of substantially parallel mounting plates spaced apart a distance sufficient to receive said first structure therebetween, said width of said first structure defined parallel to said third and fourth side walls thereof being less than said distance by which said mounting plates of said second structure are spaced apart;
   and
   said second pin receiving hole means includes first and second aligned openings, one in each of said parallel mounting plates;
   a first weld washer having a third pin receiving hole means disposed therethrough for closely receiving said connecting pin, said first weld washer being adapted to be located adjacent and engage said second structure;
   and
   said connecting pin being received in said first, second and third pin receiving hole means and said weld washer being welded to said second structure so that said first and second structures are connected by said connecting pin, with said connecting pin being closely received in said first hole means of said first structure and also being closely received in said third hole means which is fixed relative to said second structure.

2. The system of claim 1, wherein:
   said third and fourth side walls are the flanges of an I-beam.

3. The system of claim 1, wherein:
   said second structure includes a base plate having said mounting plates extending substantially perpendicular from said base plate.

4. The system of claim 3, wherein:
   a flat outer surface on one of said third and fourth side walls of said first structure is parallel to and engages a flat major surface of said base plate of said second structure.

5. The system of claim 3, wherein:
   said second structure has said base plate thereof welded to a deck of a floating vessel; and
   said first structure is a supporting framework means for supporting equipment above said deck of said floating vessel.

6. The system of claim 3, wherein:
   said first structure is a first portion of a supporting framework, which first portion is detachably connected to a deck of a floating vessel;
   said second structure is a separate second portion of said supporting framework, which second portion is also detachably connected to said deck of said floating vessel; and
   said first and second separate portions of said supporting framework are connected by said first connecting pin and by a second connecting pin, said second connecting pin being received through other hole means of said first and second side walls and said mounting plates in a manner similar to said first connecting pin, thus forming an end connection between said first and second separate portions of said framework.

7. The system of claim 1, further comprising:
   a second weld washer having a fourth pin receiving hole means disposed therethrough for closely receiving said connecting pin, said second weld washer being adapted to be located adjacent and engage said second structure on a side of said second structure opposite said first weld washer.

8. The system of claim 7, wherein:
   said connecting pin includes an enlarged diameter head on a first end thereof and a retaining means adjacent a second end thereof, so that after said connecting pin is received through said first, second, third and fourth pin receiving hole means said enlarged diameter head and said retaining means hold said connecting pin in place within said first, second, third and fourth pin receiving hole means.

9. The system of claim 1, wherein:
   said second pin receiving hole means for loosely receiving said connecting pin is further characterized as a first adjustment means for accommodating misalignment of said first and second structures in a first direction substantially perpendicular to a longitudinal axis of said connecting pin.

10. The system of claim 9, wherein:
    said distance between said parallel monting plates is greater than a width of said first structure, thus providing a second adjusting means for accommodating misalignment of said first and second structures in a second direction substantially parallel to said longitudinal axis of said connecting pin; and
    said system further includes spacer washer means for filling a space between said first structure and at least one plate of said pair of parallel plates, said spacer washer means including fifth pin receiving hole means disposed therethrough for receiving said connecting pin.

11. The system of claim 1, wherein:
said connecting pin includes retaining means for retaining said connecting pin in place within said first, second and third pin receiving hole means, said retaining means including an enlarged head on a first end of said connecting pin and a transverse bore through said connecting pin near a second end of said connecting pin, said transverse bore having a retaining pin received therethrough.

12. A close tolerance structural pin connection apparatus, comprising:
a first structural member including first and second substantially parallel side walls and third and fourth substantially parallel side walls fixedly joined to and extending between said first and second side walls, said first and second side walls having aligned first and second pin receiving holes disposed therethrough, said first structural member having a width defined parallel to said third and fourth side walls;
a second structural member including first and second substantially parallel mounting plates having inner surfaces thereof spaced apart by a distance greater than said width of said first structural member, said first structural member being received between said first and second mounting plates of said second structural member, and said first and second mounting plates having third and fourth pin receiving holes disposed therethrough and substantially aligned with said first and second holes;
at least one spacer washer located between said first structural member and one of said first and second mounting plates, said spacer washer having a fifth pin receiving hole disposed therethrough and substantially aligned with said first, second, third, and fourth holes, said spacer washer providing a means for accommodating misalignment between said first and second structural members in a first direction substantially perpendicular to said mounting plates;
first and second weld washers located adjacent outer surfaces of first and second mounting plates, respectively, and having sixth and seventh pin receiving holes disposed therethrough, respectively, and substantially aligned with said first, second, third, fourth and fifth holes;
a cylindrical connecting pin disposed through all of said pin receiving holes, said pin having an enlarged diameter head adjacent a first end thereof and a pin retaining means adjacent a second end thereof for retaining said pin in place within all of said pin receiving holes;
wherein said first, second, sixth and seventh pin receiving holes are further characterized as having internal diameters dimensioned for closely receiving said pin therein;
wherein said third and fourth pin receiving holes are further characterized as having internal diameters substantially greater than a diameter of said pin for loosely receiving said pin and for thereby accommodating misalignment between said first and second structural members in a second direction substantially parallel to said mounting plates; and
wherein said first and second weld washers are welded to said outer surfaces of said first and second mounting plates, respectively.

13. The apparatus of claim 12, wherein:
said second structural member includes a base plate oriented substantially parallel to said third and fourth side walls of said first structural member; and
one of said third and fourth walls is supportingly engaged by said base plate.

14. The apparatus of claim 12, wherein:
said first structural member includes an I-beam having first and second flanges joined by a web, said first and second flanges being said third and fourth side walls; and
said web has an eighth pin receiving hole disposed therethrough for receiving said connecting pin.

15. A method of connecting structural members, said method comprising the steps of:
(a) providing a first structural member, said first structural member having a first circular hole means of a first internal diameter disposed therethrough;
(b) locating said first structural member adjacent a second structural member, having a second circular hole means of a second internal diameter disposed therethrough, one of said first and second internal diameters being smaller than the other of said first and second internal diameters;
(c) sufficiently aligning said first and second hole means so that an imaginary projection of a smaller one of said first and second hole means parallel to a central axis thereof is completely contained within a larger one of said first and second hole means;
(d) placing a cylindrical connecting pin, having an external diameter slightly less than said smaller one of said first and second internal diameters through said first and second hole means so that said connecting pin is loosely received in said larger one of said first and second hole means and so that said connecting pin is closely received in said smaller one of said first and second hole means;
(e) adjusting for any misalignment of said first and second structural members in a plane normal to a central axis of said connecting pin by eccentrically receiving said connecting pin in said larger one of said first and second hole means;
(f) closely receiving said connecting pin through a third circular hole means of a mounting member; and
(g) then after all of said steps (a) through (f), fixedly attaching said mounting member to one of said first and second structural members corresponding to said larger one of said first and second hole means, thereby providing a close tolerance fit between said connecting pin and said one of said first and second structural members corresponding to said larger one of said first and second hole means.

16. The method of claim 15, wherein:
said step (b) is further characterized in that said one of said first and second structural members corresponding to said larger one of said first and second hole means includes first and second substantially parallel mounting plates between which the other one of said first and second structural members is received;
said step (g) is further characterized in that said mounting member is a first weld washer, and said step of fixedly attaching is accomplished by welding said first weld washer to an outer surface of said first mounting plate; and said method further includes the step of closely receiving said connecting pin through a fourth circular hole means of a second weld washer and then welding said second weld washer to an outer surface of said second mounting plate.

17. The method of claim 16, wherein:

said step (b) is further characterized in that a distance between said first and second mounting plates is greater than a width of said other one of said first and second structural members which is received between said first and second mounting plates, to thereby allow misalignment between said first and second structural members in a direction parallel to said central axis of said connecting pin; and said method further includes the step of, prior to step (d), placing spacer washer means between said other one of said first and second structural members and at least one of said first and second mounting plates to accommodate said misalignment parallel to said central axis of said connecting pin.

18. The method of claim 15, wherein:

said step (a) is further characterized in that said second circular hole means is said larger one of said first and second hole means; and said method further includes a step of, prior to step (b), welding said second structural member to a deck of a floating vessel.

* * * * *

UNITED STATES PATENT AND TRADEMARK OFFICE
CERTIFICATE OF CORRECTION

PATENT NO. : 4,716,848

DATED : January 5, 1988

INVENTOR(S) : Lancing G. Smith et al.

It is certified that error appears in the above-identified patent and that said Letters Patent is hereby corrected as shown below:

In column 3, line 56, delete the word [to] and insert therefore --of--.

Signed and Sealed this

Fourth Day of October, 1988

Attest:

DONALD J. QUIGG

*Attesting Officer*   *Commissioner of Patents and Trademarks*